US011523653B2

(12) United States Patent
Archer et al.

(10) Patent No.: US 11,523,653 B2
(45) Date of Patent: Dec. 13, 2022

(54) COMPOSITE STRUCTURES INCLUDING A BONDING LAYER AND METHODS OF MAKING THE COMPOSITE STRUCTURE

(71) Applicant: NIKE, Inc., Beaverton, OR (US)

(72) Inventors: Paul Archer, Beaverton, OR (US); Jennifer Bee, Portland, OR (US); Jeffrey E. Darland, Tigard, OR (US)

(73) Assignee: NIKE, INC., Beaverton, OR (US)

( * ) Notice: Subject to any disclaimer, the term of this patent is extended or adjusted under 35 U.S.C. 154(b) by 462 days.

(21) Appl. No.: 16/689,336

(22) Filed: Nov. 20, 2019

(65) Prior Publication Data

US 2020/0268092 A1  Aug. 27, 2020

Related U.S. Application Data

(60) Provisional application No. 62/808,415, filed on Feb. 21, 2019.

(51) Int. Cl.
*A43B 1/14* (2006.01)
*A43B 1/10* (2006.01)
(Continued)

(52) U.S. Cl.
CPC ............... *A43B 1/14* (2013.01); *A43B 1/10* (2013.01); *A43B 13/04* (2013.01); *B32B 5/02* (2013.01);
(Continued)

(58) Field of Classification Search
CPC ............ C09J 2423/046; C09J 2423/048; C09J 2431/006; C09J 2431/008; C09J 2203/362; C09J 2301/414; C09J 2451/006; C09J 2451/008; C09J 2471/006; C09J 2471/008; C09J 2475/006; C09J 5/02; A43B 13/04; A43B 1/10; A43B 1/14; B32B 2037/243; B32B 2310/0445; B32B 2310/14; B32B 2375/00; B32B 2383/00; B32B 2437/02; B32B 25/08; B32B 27/12; B32B 27/40;
(Continued)

(56) References Cited

U.S. PATENT DOCUMENTS

2018/0345576 A1* 12/2018 Constantinou ....... A43B 13/023

FOREIGN PATENT DOCUMENTS

DE  19922516 A1  11/2000
EP  0355001 A2  2/1990
(Continued)

OTHER PUBLICATIONS

International Search Report and Written Opinion for PCT/US2019/062466 dated Feb. 27, 2020.
(Continued)

*Primary Examiner* — Lawrence D Ferguson
(74) *Attorney, Agent, or Firm* — Thomas | Horstemeyer, LLP

(57) ABSTRACT

Aspects of the present disclosure provide for composite structures including a bonding layer that adheres a substrate (e.g., including a polymeric composition such as rubber) to a material (e.g., including a polymer such as polyurethane). The adhesion of the substrate to the material through the bonding layer can include chemical bonds such as, but not limited to, siloxane linkages, silanol linkages, silyl linkages, or any combination thereof in the bonding layer.

13 Claims, 5 Drawing Sheets

(51) Int. Cl.
*A43B 13/04* (2006.01)
*B32B 5/02* (2006.01)
*B32B 5/18* (2006.01)
*B32B 7/12* (2006.01)
*B32B 25/08* (2006.01)
*B32B 27/12* (2006.01)
*B32B 27/40* (2006.01)
*B32B 37/12* (2006.01)
*B32B 37/15* (2006.01)
*B32B 37/24* (2006.01)

(52) U.S. Cl.
CPC .................. *B32B 5/18* (2013.01); *B32B 7/12* (2013.01); *B32B 25/08* (2013.01); *B32B 27/12* (2013.01); *B32B 27/40* (2013.01); *B32B 37/12* (2013.01); *B32B 37/15* (2013.01); *B32B 2037/243* (2013.01); *B32B 2310/0445* (2013.01); *B32B 2310/14* (2013.01); *B32B 2375/00* (2013.01); *B32B 2383/00* (2013.01); *B32B 2437/02* (2013.01)

(58) Field of Classification Search
CPC ........... B32B 37/12; B32B 37/15; B32B 5/02; B32B 5/18; B32B 7/12; C08J 2323/08; C08J 2331/04; C08J 2351/04; C08J 2371/00; C08J 2375/04; C08J 5/12
See application file for complete search history.

(56) References Cited

FOREIGN PATENT DOCUMENTS

WO 2006124437 A1 11/2006
WO 2013178991 A2 12/2013

OTHER PUBLICATIONS

International Preliminary Report on Patentability for PCT/US2019/062466, dated May 10, 2021.
Written Opinion for PCT/US2019/062466, dated Oct. 14, 2020.

\* cited by examiner

COMPOSITE STRUCTURES INCLUDING A BONDING LAYER AND METHODS OF MAKING THE COMPOSITE STRUCTURE

CROSS-REFERENCE TO RELATED APPLICATIONS

This application claims priority to, U.S. Patent Application entitled "COMPOSITE STRUCTURES INCLUDING A BONDING LAYER AND METHODS OF MAKING THE COMPOSITE STRUCTURE," filed on Feb. 21, 2019, and assigned application No. 62/808,415, which is incorporated herein by reference in its entirety.

BACKGROUND

Processes that are used to form textiles such as footwear typically involve the use of various chemicals and processes to adhere different parts of the footwear. Generally these processes use traditional stock fitting that is a labor intensive multi-step processes that include the use of primers, adhesives, and curing to adhere different parts of the textile.

BRIEF DESCRIPTION OF THE DRAWINGS

Further embodiments of the present disclosure will be more readily appreciated upon review of the detailed description of its various embodiments, described below, when taken in conjunction with the accompanying drawings.

FIGS. 1A-1M shows various articles of footwear, apparel, athletic equipment, container, electronic equipment, and vision wear that include the bonding layer in accordance with the present disclosure, while

DESCRIPTION

Figure 1A:
Figure 1B:
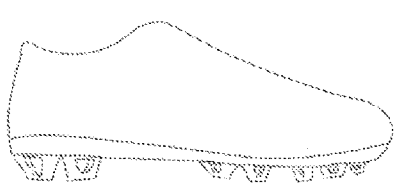
Figure 1C:
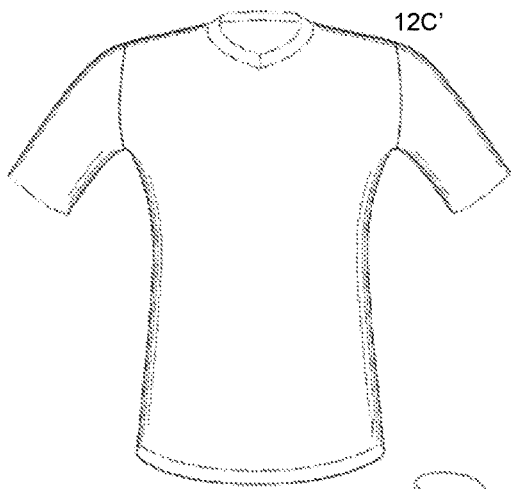
Figure 1D:
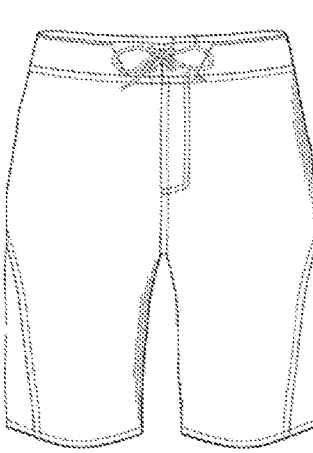
Figure 1E:
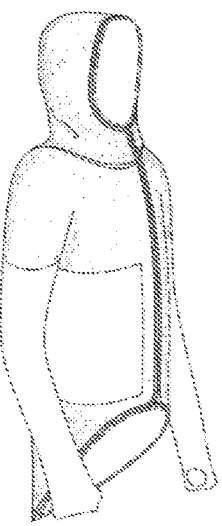
Figure 1F:
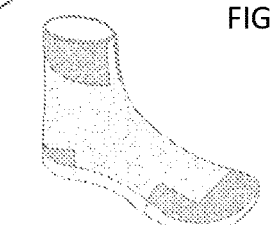
Figure 1H:
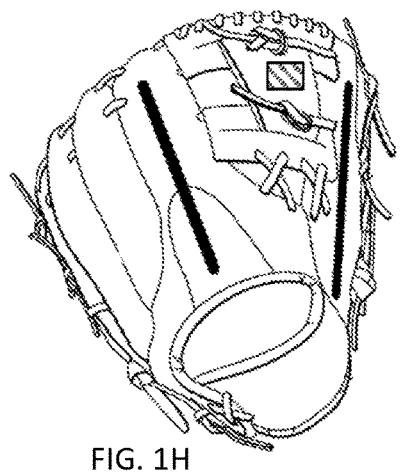
Figure 1I:
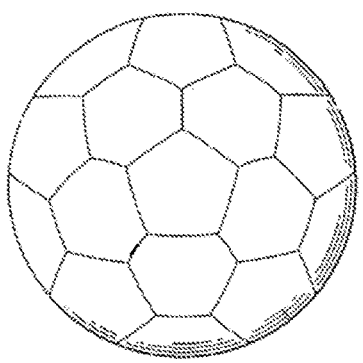
Figure 1J:
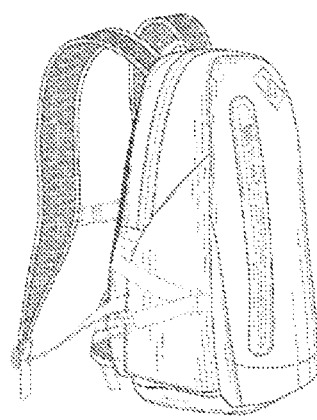
Figure 1K:
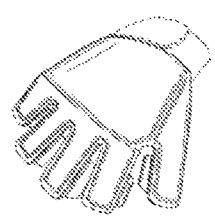
Figure 1L:
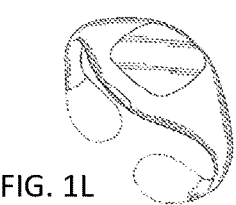
Figure 1M:
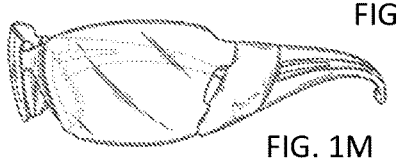

The present disclosure provides for composite structures including a bonding layer that adheres a substrate (e.g., including a polymeric composition such as rubber) to a material (e.g., including a polymer such as polyurethane). The adhesion of the substrate to the material through the bonding layer can include chemical bonds such as, but not limited to, siloxane linkages, silanol linkages, silyl linkages, or any combination thereof in the bonding layer. Upon completion of the composite structure the adhesive strength between the substrate and the material increases about 10 fold or more versus a control. In a particular aspect, the composite structure can be used in a textile such as footwear, where use of the composite substrate eliminates the use of adhesives, solvents, and/or priming, while having the same or improved adhesive properties.

In an aspect, the composite structure can be made by forming a bonding layer on a surface of the substrate. The process of forming the bonding layer causes the formation of a plurality of free radical moieties, a plurality of silicates, or both. Subsequently, the material, a solid or liquid resin or foam, is contacted with the bonding layer to form the composite structure. The composite structure can then be processed to form a textile. Use of the bonding layer removes the need for traditional stock fitting, which can eliminate most, if not all of the labor intensive multi-step processes and use of primers and/or adhesives as well as the associated and curing procedures. In addition, the cycling time for making the composite structures is reduced and the process can be automated, both of which can increase efficiency.

The present disclosure will be better understood upon reading the following numbered aspects, which should not be confused with the claims. Any of the numbered aspects below can, in some instances, be combined with aspects described elsewhere in this disclosure and such combinations are intended to form part of the disclosure.

Aspect 1. A method of making an article, comprising: forming a bonding layer that comprises a plurality of free radical moieties, a plurality of silicates, or both, on a surface of a substrate that comprises a polymeric composition; contacting the bonding layer with a material comprising a plurality of first polyurethane (PU) polymer chains; and forming chemical bonds between a portion of the plurality of free radical moieties of the bonding layer and a first portion of the plurality of first PU polymer chains of the material, between a portion of the plurality of silicates of the bonding layer and a second portion of the plurality of first PU polymer chains of the material, or both.

Aspect 2. The method of aspect 1, wherein the forming the bonding layer comprises treating the surface of the substrate using a process selected from the group consisting of: hydrocarbon flame processing, flame silanization, plasma processing, corona processing, deposition of silicates, or any combination thereof, thereby forming the plurality of free radical moieties, the plurality of silicates, or both, on the surface of the substrate.

Aspect 3. The method of aspects 1 and 2, wherein, during the contacting, the material is a liquid resin or a foam.

Aspect 4. The method of any of aspects 1 to 3, wherein forming chemical bonds between a portion of the plurality of free radical moieties of the bonding layer and a first portion of the plurality of first PU polymer chains of the material comprises forming chemical bonds between the portion of the plurality of free radical moieties of the bonding layer and a first portion of urethane moieties of the plurality of first PU polymer chains of the material.

Aspect 5. The method of any of aspects 1 to 4, wherein forming chemical bonds between a portion of the plurality of silicates of the bonding layer and a second portion of the plurality of first PU polymer chains of the material comprises forming chemical bonds between the portion of the plurality of silicates of the bonding layer and a second portion of urethane moieties of the plurality of first PU polymer chains of the material.

Aspect 6. The method of aspects 1 to 5, wherein the polymeric composition of the substrate comprises a second plurality of polymer chains, and the forming chemical bonds between the portion of the plurality of free radical moieties, the plurality of silicates, or both comprises forming chemical bonds between a portion of the plurality of first PU chains and a portion of the second plurality of polymer chains.

Aspect 7. The method of aspects 1 to 6, wherein the forming chemical bonds between the portion of the plurality of free radical moieties of the bonding layer and the first portion of the plurality of first PU polymer chains of the material, between the portion of the plurality of silicates of the bonding layer and the second portion of the plurality of first PU polymer chains or of the polymeric material, or both, includes forming siloxane linkages, silanol linkages, silyl linkages, or any combination thereof.

Aspect 8. The method of aspects 1 to 7, wherein forming chemical bonds between the portion of the plurality of free radical moieties of the bonding layer and the first portion of the plurality of first PU polymer chains of the material, between the portion of the plurality of silicates of the bonding layer and the second portion of the plurality of first PU polymer chains or of the polymeric material, or both, includes forming urethane-siloxane linkages, urethane-silanol linkages, urethane-silyl linkages, or any combination thereof.

Aspect 9. The method of aspects 1 to 8, wherein the polymeric composition of the substrate comprises a plurality of polymer chains selected from the group consisting of: a cured rubber, a polyether block amide, an ethylene vinyl acetate, and any combination thereof.

Aspect 10. The method of aspect 9, wherein the cured rubber further comprises an additive comprising a plurality of polymer chains individually having a maleic anhydride moiety grafted to the polymer chain.

Aspect 11. An article made by the method of aspects 1 to 10.

Aspect 12. The article of aspect 11, wherein the article is an article of footwear, a component of footwear, apparel, a component of apparel, sporting equipment, or a component of sporting equipment.

Aspect 13. An article comprising: a composite structure comprising a material bonded to a substrate, the material comprising a plurality of first polyurethane (PU) chains, the substrate comprising a polymeric composition including a plurality of second polymer chains, wherein the substrate has at least a first side including a bonding layer bonded to the material, wherein the bonding layer includes a plurality of chemical bonds between a portion of the plurality of first PU chains and a portion of the plurality of second polymer chains, wherein a portion of the chemical bonds include siloxane linkages, silanol linkages, silyl linkages, or any combination thereof.

Aspect 14. The article of aspect 13, wherein the portion of the chemical bonds include urethane-siloxane linkages, urethane-silanol linkages, urethane-silyl linkages, or any combination thereof.

Aspect 15. The article of aspect 13 or 14, wherein, with the exception of the bonding layer, the material is substantially free of PU chains including siloxane linkages, silanol linkages, and silyl linkages, and the polymeric composition of the substrate is substantially free of second polymer chains including siloxane linkages, silanol linkages, and silyl linkages.

Aspect 16. The article of aspects 13 to 15, wherein the material is a solid resin or a foam.

Aspect 17. The article of aspects 13 to 16, wherein the substrate is a solid resin or a foam comprising the polymeric composition.

Aspect 18. The article of aspect 17, wherein the substrate is the foam comprising the polymeric composition.

Aspect 19. The article of aspects 13 to 18, wherein the substrate is a textile formed of yarns or fibers comprising the polymeric composition.

Aspect 20. The article of aspects 13 to 19, wherein the polymeric composition of the substrate includes a plurality of polymer chains selected from the group consisting of: cured rubber, polyether block amide, ethylene vinyl acetate, and any combination thereof.

Aspect 21. The article of aspect 20, wherein the cured rubber further comprises an additive comprising a plurality of polymer chains individually having a maleic anhydride moiety grafted to the polymer chain.

Aspect 22. The article of aspects 13 to 21, wherein the article is an article of footwear, a component of footwear, apparel, a component of apparel, sporting equipment, or a component of sporting equipment.

Aspect 23. The article of aspect 22, wherein when the article is footwear or a component of footwear, the composite structure is affixed to the footwear or the component of footwear.

Aspect 24. The article of aspect 22, wherein when the article is apparel or a component of apparel, and the composite structure is affixed to the apparel or the component of apparel.

This disclosure is not limited to particular aspects described, and as such may, of course, vary. The terminology used herein serves the purpose of describing particular aspects only, and is not intended to be limiting, since the scope of the present disclosure will be limited only by the appended claims.

Where a range of values is provided, each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

As will be apparent to those of skill in the art upon reading this disclosure, each of the individual aspects described and illustrated herein has discrete components and features which may be readily separated from or combined with the features of any of the other several aspects without departing from the scope or spirit of the present disclosure. Any recited method may be carried out in the order of events recited or in any other order that is logically possible.

Aspects of the present disclosure will employ, unless otherwise indicated, techniques of material science, chemistry, textiles, polymer chemistry, and the like, which are within the skill of the art. Such techniques are explained fully in the literature.

Unless otherwise defined, all technical and scientific terms used herein have the same meaning as commonly understood by one of ordinary skill in the art of microbiology, molecular biology, medicinal chemistry, and/or organic chemistry. Although methods and materials similar or equivalent to those described herein can be used in the practice or testing of the present disclosure, suitable methods and materials are described herein.

As used in the specification and the appended claims, the singular forms "a," "an," and "the" may include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

Now having described aspects of the present disclosure in general, additional details are provided. The present disclosure includes composite structures and methods of making the composite structure. The composite structure can be included in an article such as a textile. The composite structure can be made using a bonding layer to adhere a substrate (e.g., including a polymeric composition such as rubber) to a material (e.g., including a polymer such as polyurethane). The adhesion of the substrate to the material through the bonding layer can include chemical bonds such as, but not limited to, siloxane linkages, silanol linkages, silyl linkages, or any combination thereof in the bonding layer.

As described herein, the composite structure can be made by forming a bonding layer on a surface of a substrate (e.g., including a polymeric composition). The bonding layer can include a plurality of free radical moieties, a plurality of silicates, or both. In an aspect, the bonding layer can be on the order of a nanometers to micrometers to millimeters in thickness (e.g., about 50 nanometers to 10 millimeters, about 500 nanometers to 10 millimeters, about 1 micrometer to 10 millimeters, about 10 micrometers to 10 millimeters, about 100 micrometers to 10 millimeters, about 1 micrometer to 5 millimeters, about 10 micrometers to 5 millimeters, about 100 micrometers to 5 millimeters, about 100 nanometers to 5 millimeters, or about 500 nanometers to 5 millimeters) depending upon the process used and the chemical composition of the substrate surface.

The free radical moieties can include moieties having one or more unpaired valence electrons. The free radical moieties can be formed from the chemical species on the surface of the substrate, the chemical species used in the process of forming the bonding layer, and combinations of the species. In an aspect, the free radical species can be free radical hydrocarbons (e.g., C1 to C20, saturated or unsaturated, linear, branched, cyclic, or aromatic, or combinations thereof), free radicals derived from the polymers on the surface of the substrate (e.g., free radicals derived from rubber, polyether block amide, or ethylene vinyl acetate), free radicals including silicon (e.g., free radical silicates), and combinations thereof.

The silicates can include anionic silicon groups having the general formula of $[SiO_{2+n}]^{2n-}$, where the silicate can have a $[SiO_4]^{4-}$ center or can be part of a chain (e.g., $(Si_2O_6)^{4-}$, $(Si_2O_7)^{6-}$, $(Si_4O_{11})^{6-}$, $(Si_2O_4)^{-2}$), ring (e.g., $(Si_6O_{18})^{12-}$), or any combination thereof. The silicate can be single chain silicates m $[[Si_nO_{3n}]^{2n-}]_m$, double chain silicate $[Si_{4n}O_{11n}]^{6n-}$, sheet-forming silicates $[[Si_{2n}O_{5n}]^{2n-}]_p$, or combinations thereof. The value of n, m, or p can each independently vary depending upon the type of silicate and can be 0.5 to 20 or 0.5 to 100 or more.

After or as the bonding layer is formed, the bonding layer is contacted with a material (e.g., a liquid or solid resin or foam). In an aspect, the material can include a plurality of first polyurethane (PU) polymer chains, where the PU polymer chains are part of the resin or foam. Chemical bonds (e.g., covalent, ionic, and the like) can be formed a) between a portion of the plurality of free radical moieties of the bonding layer and a first portion of the plurality of first PU polymer chains of the material, b) between a portion of the plurality of silicates of the bonding layer and a second portion of the plurality of first PU polymer chains or of the polymeric material, or a combination of both a) and b). The chemical bonds can include siloxane linkages, silanol linkages, silyl linkages, or any combination thereof.

The chemical bonds between the free radical moieties of the bonding layer and the plurality of first PU polymer chains includes chemical bonds between the free radical moieties of the bonding layer and urethane moieties of the plurality of first PU polymer chains of the material. The chemical bonds between the silicates of the bonding layer and the PU polymer chains includes forming chemical bonds between the silicates of the bonding layer and the urethane moieties of the plurality of first PU polymer chains of the material.

Chemical bonds between the free radical moieties of the bonding layer and the PU polymer chains of the material, between the silicates of the bonding layer and the PU polymer chains or of the polymeric material, or both, can include forming urethane-siloxane linkages, urethane-silanol linkages, urethane-silyl linkages, or any combination thereof.

Subsequently, the material and/or the substrate, if uncured or partially cured, can be partially cured or fully cured to form the composite structure. The bonding layer or the composite structure can make up or be part of an article such as a textile. For example, the textile can include footwear or components thereof, apparel (e.g., shirts, jerseys, pants, shorts, gloves, glasses, socks, hats, caps, jackets, undergarments) or components thereof, bladder (e.g., gas bladder for footwear and the like), containers (e.g., backpacks, bags), upholstery for furniture (e.g., chairs, couches, car seats), bed coverings (e.g., sheets, blankets), table coverings, towels, flags, tents, sails, and parachutes. In addition, the composite structure can be used with or disposed on articles or other items such as striking devices (e.g., bats, rackets, sticks, mallets, golf clubs, paddles, etc.), athletic equipment (e.g., golf bags, baseball and football gloves, soccer ball restriction structures), protective equipment (e.g., pads, helmets, guards, visors, masks, goggles, etc.), locomotive equipment (e.g., bicycles, motorcycles, skateboards, cars, trucks, boats, surfboards, skis, snowboards, etc.), balls or pucks for use in various sports, fishing or hunting equipment, furniture, electronic equipment, construction materials, eyewear, timepieces, jewelry, and the like.

Figure 1N:
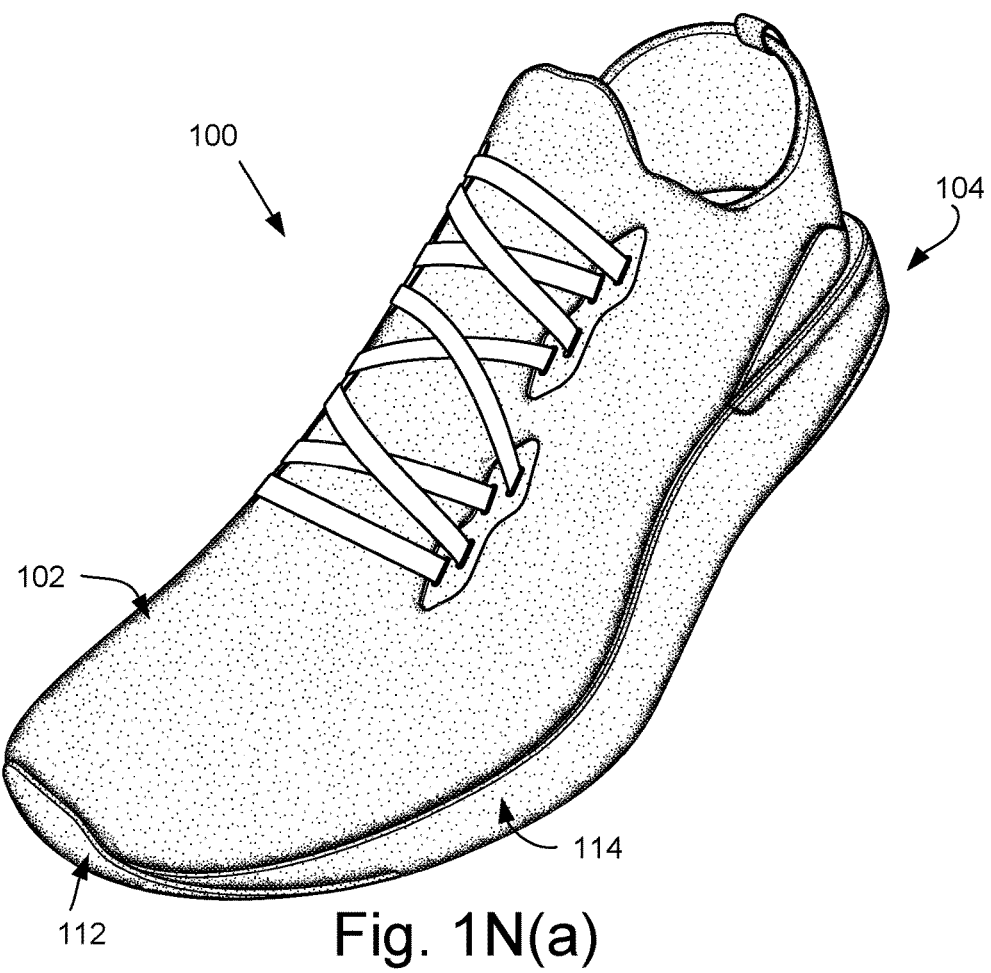
FIGS. 1N-1P illustrate additional details regarding different types of footwear.
Figure 1N:
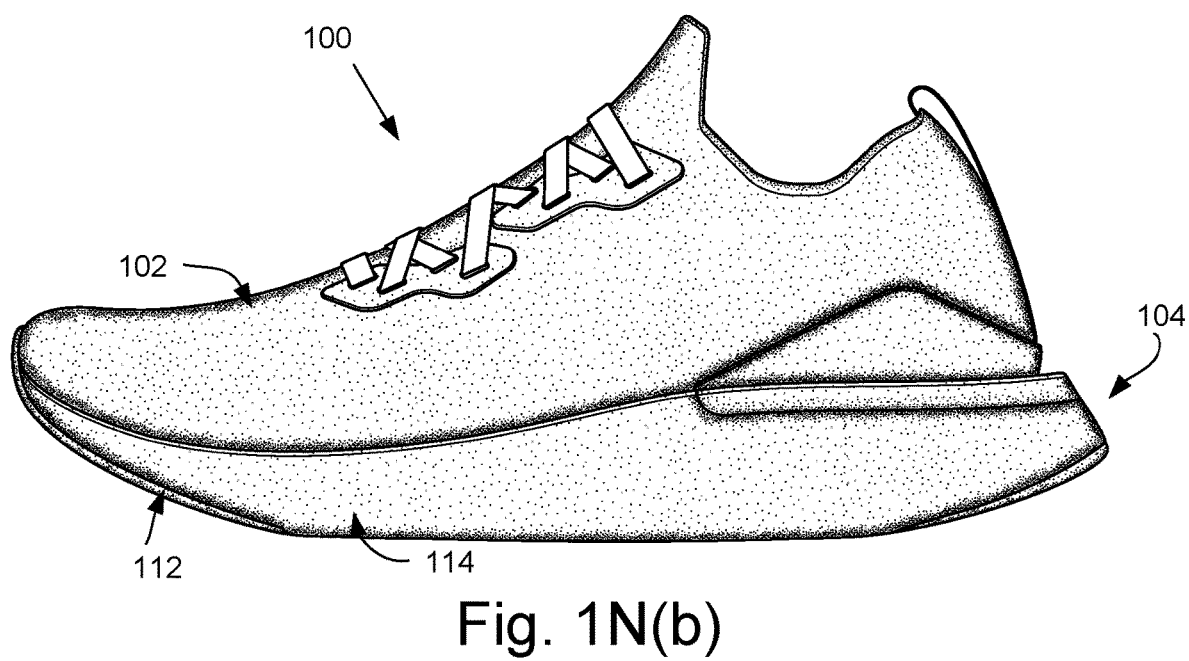

FIGS. 1A-M illustrate articles of manufacture that include the bonding layer or the composite structure of the present disclosure. FIGS. 1N(a) and 1N(b) illustrate a perspective view and a side view of an article of footwear 100 that includes a sole structure 104 and an upper 102. The sole structure 104 is secured to the upper 102 and extends between the foot and the ground when the article of footwear 100 is worn. The primary elements of the sole structure 104 area midsole 114 and an outsole 112. The midsole 114 is secured to a lower area of the upper 102 and may be formed of a polymer foam or another appropriate material. In other configurations, the midsole 114 can incorporate fluid-filled chambers, plates, moderators, and/or other elements that further attenuate forces, enhance stability, or influence motions of the foot. The outsole 112 is secured to a lower surface of the midsole 114 and may be formed from a wear-resistant rubber material that is textured to impart traction, for example. The upper 102 can be formed from various elements (e.g., lace, tongue, collar) that combine to provide a structure for securely and comfortably receiving a foot. Although the configuration of the upper 102 may vary significantly, the various elements generally define a void within the upper 102 for receiving and securing the foot relative to sole structure 104. Surfaces of the void within the upper 102 are shaped to accommodate the foot and can extend over the instep and toe areas of the foot, along the medial and lateral sides of the foot, under the foot, and around the heel area of the foot. The upper 102 can be made of one or more materials such as textiles, a polymer foam, leather, synthetic leather, and the like that are stitched or bonded together. Although this configuration for the sole structure 104 and the upper 102 provides an example of a sole structure that may be used in connection with an upper, a variety of other conventional or nonconventional configurations for the sole structure 104 and/or the upper 102 can also be utilized. Accordingly, the configuration and features of the sole structure 104 and/or the upper 102 can vary considerably.

Figure 1O:
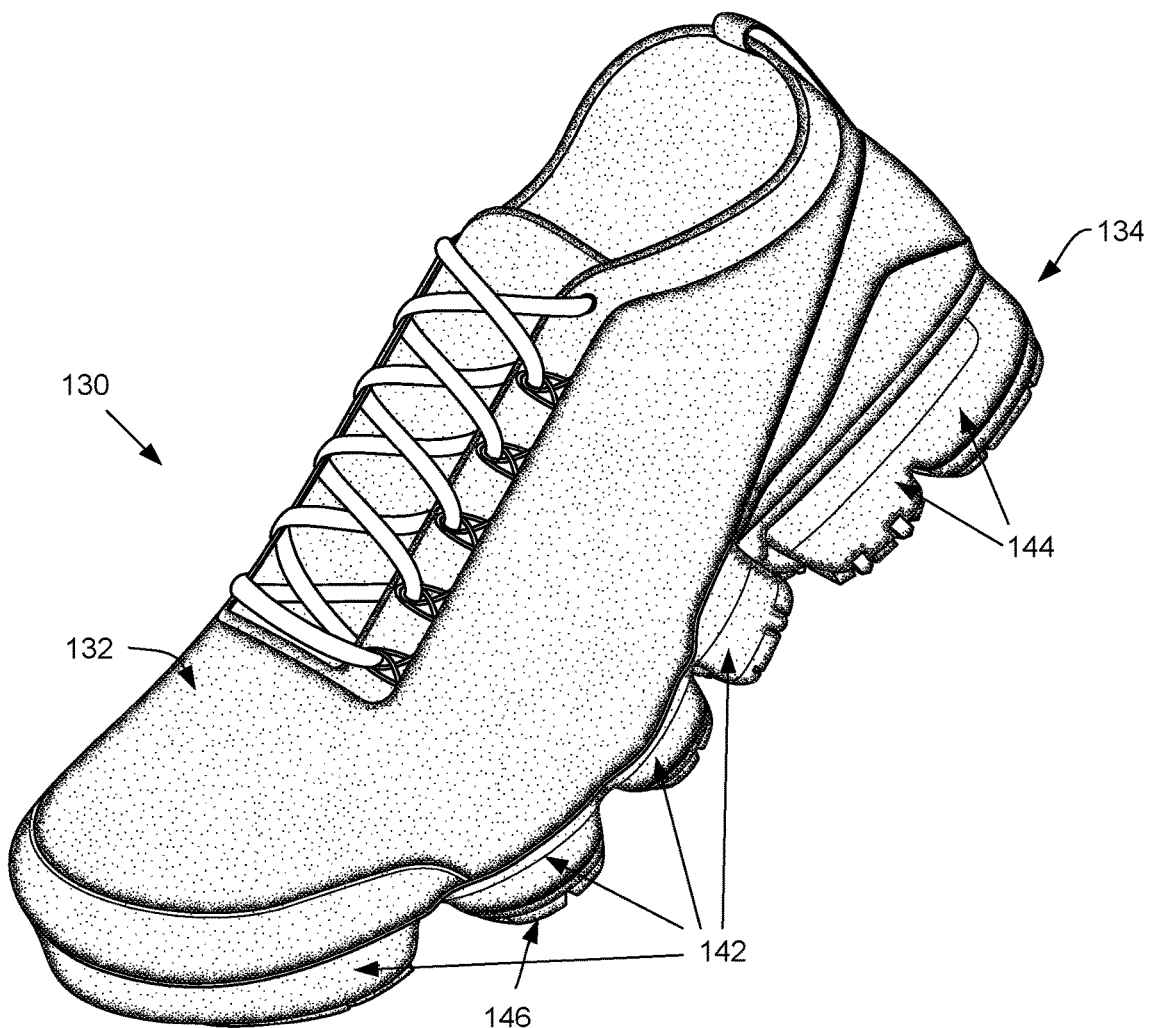
Figure 1O:
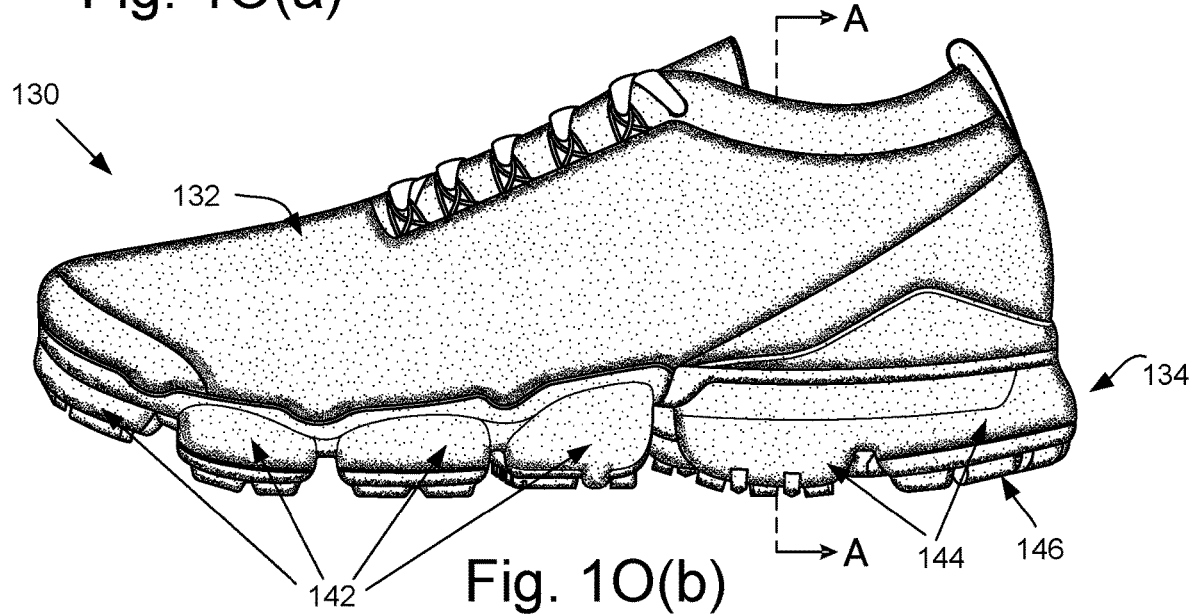
Figure 1O:
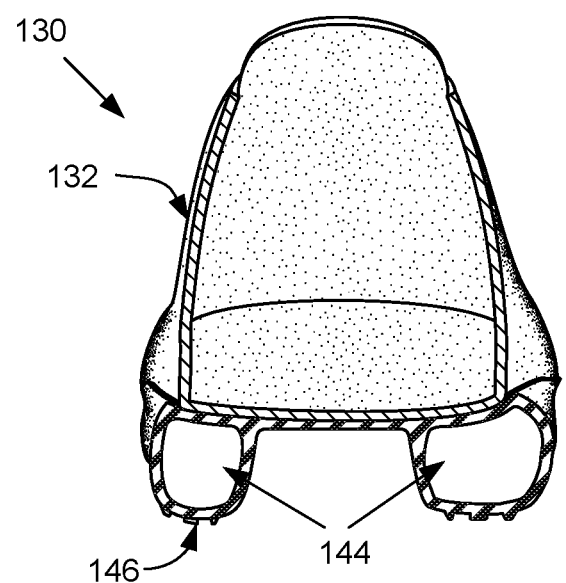

FIGS. 1O(a) and 1O(b) illustrate a perspective view and a side view of an article of footwear 130 that include a sole structure 134 and an upper 132. The sole structure 134 is secured to the upper 132 and extends between the foot and the ground when the article of footwear 130 is worn. The upper 132 can be formed from various elements (e.g., lace, tongue, collar) that combine to provide a structure for securely and comfortably receiving a foot. Although the configuration of the upper 132 may vary significantly, the various elements generally define a void within the upper 132 for receiving and securing the foot relative to the sole structure 134, Surfaces of the void within the upper 132 are shaped to accommodate the foot and can extend over the instep and toe areas of the foot, along the medial and lateral sides of the foot, under the foot, and around the heel area of the foot. The upper 132 can be made of one or more materials such as textiles including natural and synthetic leathers, molded polymeric components, polymer foam and the like that are stitched or bonded together.

The primary elements of the sole structure 134 are a forefoot component 142, a heel component 144, and an outsole 146. Each of the forefoot component 142 and the heel component 144 are directly or indirectly secured to a lower area of the upper 132 and formed from a polymer material that encloses a fluid, which may be a gas, liquid, or gel. During walking and running, for example, the forefoot component 142 and the heel component 144 compress between the foot and the ground, thereby attenuating ground reaction forces. That is, the forefoot component 142 and the heel component 144 are inflated and may be pressurized with the fluid to cushion the foot. The outsole 146 is secured to lower areas of the forefoot component 142 and the heel component 144 and may be formed from a wear-resistant rubber material that is textured to impart traction. The forefoot component 142 can be made of one or more polymers (e.g., layers of one or more polymers films) that form a plurality of chambers that includes a fluid such as a gas. The plurality of chambers can be independent or fluidically interconnected. Similarly, the heel component 144 can be made of one or more polymers (e.g., layers of one or more polymers films) that form a plurality of chambers that includes a fluid such as a gas and can also be independent or fluidically interconnected. In some configurations, the sole structure 134 may include a foam layer, for example, that extends between the upper 132 and one or both of the forefoot component 142 and the heel component 144, or a foam element may be located within indentations in the lower areas of the forefoot component 142 and the heel component 144. In other configurations, the sole structure 132 may incorporate plates, moderators, lasting elements, or motion control members that further attenuate forces, enhance stability, or influence the motions of the foot, for example. Although the depicted configuration for the sole structure 134 and the upper 132 provides an example of a sole structure that may be used in connection with an upper, a variety of other conventional or nonconventional configurations for the sole structure 134 and/or the upper 132 can also be utilized. Accordingly, the configuration and features of the sole structure 134 and/or the upper 132 can vary considerably. FIG. 1O(c) is a cross-sectional view of A-A that depicts the upper 132 and the heel component 144.

Figure 1P:
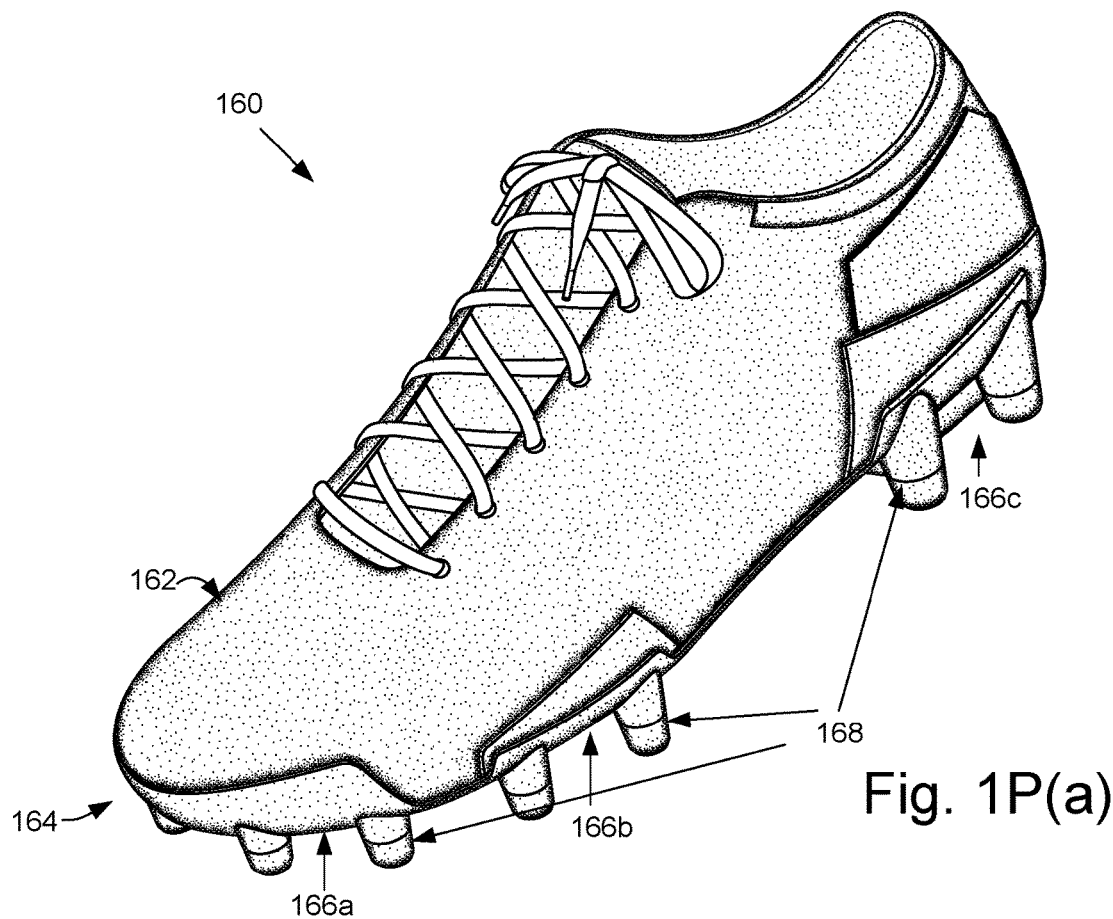
Figure 1P:
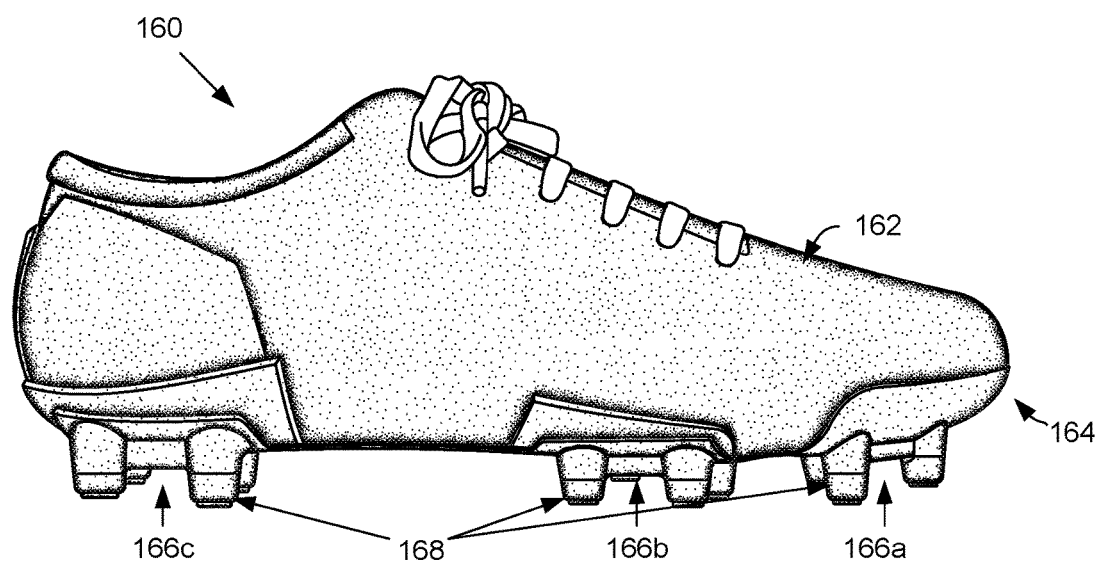

FIGS. 1P(a) and 1P(b) illustrate a perspective view and a side view of an article of footwear 160 that includes traction elements 168. The article of footwear 160 includes an upper 162 and a sole structure 164, where the upper 162 is secured to the sole structure 164. The sole structure 164 can include one or more of a toe plate 166a, a mid-plate 166b, and a heel plate 166c. The plate can include one or more traction elements 168, or the traction elements can be applied directly to a ground-facing surface of the article of footwear. As shown in FIGS. 1P(a) and (b), the traction elements 168 are cleats, but the traction elements can include lugs, cleats, studs, and spikes as well as tread patterns to provide traction on soft and slippery surfaces. In general, the cleats, studs and spikes are commonly included in footwear designed for use in sports such as global football/soccer, golf, American football, rugby, baseball, and the like, while lugs and/or exaggerated tread patterns are commonly included in footwear (not shown) including boots design for use under rugged outdoor conditions, such as trail running, hiking, and military use. The sole structure 164 is secured to the upper 162 and extends between the foot and the ground when the article of footwear 160 is worn. The upper 162 can be formed from various elements (e.g., lace, tongue, collar) that combine to provide a structure for securely and comfortably receiving a foot. Although the configuration of the upper 162 may vary significantly, the various elements generally define a void within the upper 162 for receiving and securing the foot relative to the sole structure 164. Surfaces of the void within upper 162 are shaped to accommodate the foot and extend over the instep and toe areas of the foot, along the medial and lateral sides of the foot, under the foot, and around the heel area of the foot. The upper 162 can be made of one or more materials such as textiles including natural and synthetic leathers, molded polymeric components, a polymer foam, and the like that are stitched or bonded together. In other aspects not depicted, the sole structure 164 may incorporate foam, one or more fluid-filled chambers, plates, moderators, or other elements that further attenuate forces, enhance stability, or influence the motions of the foot. Although the depicted configuration for the sole structure 164 and the upper 162 provides an example of a sole structure that may be used in connection with an upper, a variety of other conventional or nonconventional configurations for the sole structure 164 and/or the upper 162 can also be utilized. Accordingly, the configuration and features of the sole structure 164 and/or the upper 162 can vary considerably.

The composite structure, the materials, and/or the substrate can include fibers or yarns. The terms "fiber" or "fibers" as used herein refers to materials that are in the form of discrete elongated pieces. The fibers may be produced by conventional, techniques such as electrospinning, interfacial polymerization, pulling, and the like. The fiber can be in for form of bundles of strands of fibers (e.g., yarn), rovings, woven fibers, non-woven fibers, three-dimensional reinforcements such as braids, and the like. In general, "yarn" is defined as an assembly having a substantial length and relatively small cross-section that is formed of at least one fiber or a plurality of fibers.

The fiber can include organic fibers or natural fibers (e.g., silk). The organic fiber can be formed from organic polymers capable of forming fibers such as poly(ether ketone), polyimide, polybenzoxazole, poly(phenylene sulfide), polyesters, polyethylene, aromatic polyamides (e.g., an aramid polymer such as para-aramid fibers and meta-aramid fibers), aromatic polyimides, polybenzimidazoles, polyetherimides, polytetrafluoroethylene, acrylic resins, poly(vinyl alcohol) or the like; natural fibers (e.g., silk). The fiber can be a carbon fiber such as Tarifyl® produced by Formosa Plastics Corp, (e.g., 12 k, 24 k, and 48 k tow, specifically fiber types TC-35 and TC-35R), carbon fiber produced by SGL Group (e.g., 50 k tow), carbon fiber produced by Hyosung, carbon fiber produced by Toho Tenax, fiberglass produced by Jushi Group Co., LTD (e.g., E6, 318, silane-based sizing, filament diameters 14, 15, 17, 21, and 24 μm), and polyester fibers produced by Amann Group (e.g., Serafile 200/2 non-lubricated polyester filament and Serafile COMPHIL 200/2 lubricated polyester filament).

The fibers can have round or essentially round cross sections and in other aspect the fibers have non-round fiber cross sections. The fibers can be continuous and chopped fibers. The fibers can have a length of about 1 mm to 100 cm or more as well as any increment therein (e.g., 1 mm increments).

The fiber can be a monofilament or multifilament fiber and can be used either alone or in combination with other types of fiber, through, for example, co-weaving or core/sheath, side-by-side, orange-type or matrix and fibril constructions, or by other methods known to one skilled in the art of fiber manufacture.

The surface of the substrate can include a polymeric composition, where the polymeric composition can include a plurality of polymer chains. For example, the polymeric composition of the substrate can include a plurality of polymer chains such as: those present in cured rubber, polyether block amide chains, ethylene vinyl acetate chains, and any combination thereof. In an aspect, the substrate can be a solid resin or a foam, cured, uncured, or partially cured. The rest of the substrate can be formed of the same material or other materials. The polymeric composition of the substrate is substantially free (e.g., about 90% or more, about 95% or more, about 99% or more, or about 99.9% or more) of second polymer chains including siloxane linkages, silanol linkages, and silyl linkages.

The rubber (e.g., uncured rubber, partially cured rubber, or cured rubber) can include one or more natural and/or synthetic rubbers. The natural or synthetic rubbers can include: butadiene rubber, styrene-butadiene (SBR) rubber, butyl rubber, isoprene rubber, urethane rubber (e.g., millable), nitrile rubber, neoprene rubber, ethylene propylene diene monomer (EPDM) rubber, ethylene-propylene rubber, urethane rubber or any combination thereof. Other examples of rubber compounds include, but are not limited to, elastomeric polymers, such as polyolefins, polynorbornene rubber, methyl methacrylate butadiene styrene rubber (MBS), styrene ethylene butylene (SEBS) rubber, silicone rubber, urethane rubber, and mixtures thereof. The natural or synthetic rubbers may be individually selected as virgin materials, regrind materials, or a mixture thereof.

The rubber further can include an additive. For example, the additive can include a plurality of polymer chains individually having a maleic anhydride moiety grafted to the polymer chain. The additive can be a functionalized polymer that has been modified by grafting maleic anhydride groups into the polymer backbone, end groups, or side groups, including ethylene-based polymers with maleic anhydride grafting. The additive can be Dupont™ Fusabond® (sold by E. I. du Pont de Nemours and Company), which is a functional polymer that includes modified ethylene acrylate carbon monoxide terpolymers, ethylene vinyl acetates (EVAs), polyethylenes, metallocenepolyethylenes, ethylene propylene rubbers and polypropylenes, where the modification to the functional polymer can include maleic anhydride grafted to the functional polymer. The amount of the additive present in the uncured rubber formulation can be up to 10 parts per hundred resin (phr), or from about 1 phr to about 8 phr, or from about 3 phr to about 6 phr.

In some examples, the rubber can further include fillers; process oils; and/or a curing package including at least one of crosslinking initiator(s), crosslinking accelerator(s), and crosslinking retarder(s). Examples of fillers include, but are not limited to, carbon black, silica, and talc. Examples of process oils include, but are not limited to, paraffin oil and/or aromatic oils. Examples of crosslinking initiators include, but are not limited to sulfur or peroxide initiators such as di-t-amyl peroxide, di-t-butyl peroxide, t-butyl cumyl peroxide, di-cumyl peroxide (DCP), di(2-methyl-1-phenyl-2-propyl)peroxide, t-butyl 2-methyl-1-phenyl-2-propyl peroxide, di(t-buylperoxy)-diisopropylbenzene, 2,5-dimethyl-2,5-di(t-butylperoxy)hexane, 2,5-dimethyl-2,5-di(t-butylperoxy)hexyne-3,1,1-di(t-butylperoxy)-3,3,5-trimethylcyclohexane, 4,4-di(t-butylperoxy)-n-butylvalerate, and mixtures thereof. Examples of crosslinking accelerators include, but are not limited to, N-cyclohexyl-2-benzothiazole sulfenamide (CBZ), N-oxydiethylene-2-benzothiazole sulfenamide, N,N-diisopropyl-2-benzothiazole sulfenamide, 2-mercaptobenzothiazole, 2-(2,4-dinitrophenyl)mercaptobenzothiazole, 2-(2,6-diethyl-4-morpholinothio)benzothiazole and dibenzothiazyl disulfide; guanidine compounds, such as diphenylguanidine (DPG), triphenylguanidine, diorthonitrileguanidine, orthonitrile biguanide and diphenylguanidine phthalate; aldehyde amine compounds or aldehyde ammonia compounds, such as acetaldehyde-aniline reaction product, butylaldehyde-aniline condensate, hexamethylenetetramine and acetaldehyde ammonia; imidazoline compounds, such as 2-mercaptoimidazoline; thiourea compounds, such as thiocarbanilide, diethylthiourea, dibutylthiourea, trimethylthiourea and diorthotolylthiourea; thiuram compounds, such as tetramethylthiuram monosulfide, tetramethylthiuram disulfide, tetraethylthiuram disulfide, tetrabutylthiuram disulfide and pentamethylenethiuram tetrasulfide; dithioate compounds, such as zinc dimethyldithiocarbamate, zinc diethyldithiocarbamate, zinc di-n-butyldithiocarbamate, zinc ethylphenyldithiocarbamate, zinc butylphenyldithiocarbamate, sodium dimethyldithiocarbamate, selenium dimethyldithiocarbamate and tellurium dimethyldithiocarbamate; xanthate compounds, such as zinc dibutylxanthogenate; and other compounds, such as zinc white. Examples of crosslinking retarders include, but are not limited to, alkoxyphenols, catechols, and benzoquinones, and alkoxyphenols such as 3,5-di-t-butyl-4-hydroxyanisol.

The rubber can include at least some level of curing, but is generally at least partially cured. Or stated another way, the rubber compound can be at least partially cured.

As used herein, the term "partially cured" generally refers to a compound (e.g., a rubber) having a relatively low crosslink density of less than or equal to $10^{-3}$ moles/cm$^3$, or less than or equal to $10^{-5}$ moles cm$^3$. For example, the partially cured polymeric compound can have from about 15 to about 1500 monomer units present between crosslinks. Dynamic mechanical analysis (DMA) can be used to determine the modulus plateau for the compound. In the region of the modulus plateau above the glass transition temperature of the compound and below the melting point of the compound, the crosslink density is directly proportional to the modulus of the compound.

As used herein, the term "cured" generally refers to a compound (e.g., a rubber) having a relatively high crosslink density. For example, the crosslink density of the cured compound can be at least 20 percent greater, or at least 30 percent greater, or at least 50 percent greater than the crosslink density of the uncured or partially cured compound.

Examples of crosslinking reactions (i.e., vulcanization reactions) include, but are not limited to, free-radical reactions, ionic reactions (both anionic and cationic), addition reactions, and metal salt reactions. Crosslinking reactions can be initiated by actinic radiation, including heat, UV, electron beam or other high energy sources.

The ethylene vinyl acetate (EVA) chain can include:

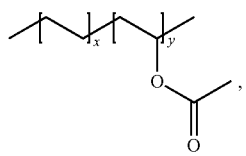

each of the ethylene and vinyle acetate are about 10 to 60 weight percent of the chain and x and y can each independently be about 1 to 10,000.

The polyether block amide chains are formed of linear chains of mainly polyamide blocks that are covalently bonded to flexible polyether segments via an ester link. The polyether block amide chain precursor can be made by polycondensation, starting from a dicarboxylic acid of a polyamide (e.g., Nylon 6, Nylon 11, Nylon 12, and the like) on the one hand, and a polyether (e.g., PTMG, PEG, and the like) with two terminal hydroxyl groups on the other hand. The general structure of the polyether block amide chain can be schematically represented for example as: —[CO-A-CO—O—B—O—]—, in which A represents a polyamide chain, derived from a polyamide which initially comprised two terminal carboxyl groups and has lost them in a reaction; B represents a polyoxyalkylene chain derived from a polyoxyalkylene glycol which initially comprised two terminal hydroxyl groups but which has lost them in a reaction as well; and n is the number of units out of which the polymer chain is built.

Forming the bonding layer can be done by treating the surface of the substrate using a process thereby forming the plurality of free radical moieties, the plurality of silicates, or both, on the surface of the substrate. The process can include: hydrocarbon flame processing, flame silanization, plasma processing, corona processing, deposition of silicates, or any combination thereof.

Hydrocarbon flame processing includes the combustion of a hydrocarbon using a flame, where when done adjacent the surface of the substrate forms a bonding layer including free radical moieties.

The flame silanization can include forming an ultrathin $SiO_x$ polymer film on the substrate. In this regard, the substrate surface can be exposed for an extremely short period to the flame with a combustible gas mixture with a silicon-organic compound. The resulting $SiO_2$/silicate mixture forms a glass-like "$SiO_x$ polymer" in the form of an ultrathin and transparent film on the surface of the substrate to form the bonding layer on the surface of the substrate. An example of the combustible gas mixture would be a mixture including 0.6% (v/v) tetramethylsilane in a propane/butane (7:3, v/v) (Pyrosil®).

Plasma processing uses a plasma (e.g., created using air or one or more of hydrogen, nitrogen and oxygen) to achieve surface functionalization by placing the plasma adjacent the surface of the substrate. The surface functionalization includes forming a bonding layer on the surface of the substrate that can include free radical moieties, silicates, or combinations thereof.

Corona processing includes the use of a corona discharge plasma (e.g., created using electric fields) to achieve surface functionalization. The surface functionalization includes forming a bonding layer on the surface of the substrate that can include free radical moieties, silicates, or combinations thereof.

The deposition of silicates can be achieved using chemical deposition (e.g., chemical vapor deposition), physical deposition (e.g., sputtering or evaporation based techniques), and combinations thereof. The deposition can form the bonding layer on the surface of the substrate, where the bonding layer can include free radical moieties, silicates, or combinations thereof.

Now having described the substrate, the material is now described. The material can be a liquid or solid resin, and/or cured, partially cured, or uncured, and/or a foam. The material can be a polymeric composition, where the polymeric composition can include polyurethanes, polyesters, polyamides, vinyl polymers (e.g., copolymer of vinyl alcohol, vinyl esters, ethylene, acrylates, methacrylates, styrene, and so on), polyacrylonitrile, polyphenylene ethers, polycarbonates, elastomers, (e.g., polyurethane elastomers (e.g., polyester-polyurethanes, polyether-polyurethanes, and polycarbonate-polyurethanes), polyurea elastomers, polyamide elastomers (PEBA or polyether block polyamides), polyester elastomers, styrene block copolymer elastomers), a copolymer thereof, a combination thereof, and the like. The polymeric composition includes a plurality of polymer chains (also referred to as "second polymer chain") of the same or different types polymers. In an aspect, the material is substantially free of polymer chains including siloxane linkages, silanol linkages, and silyl linkages. The material can have dimensions in the millimeter range to centimeter range or more.

"Polyurethane" is a generic term used to describe polymers including oligomers that contain the urethane group (—N(C=O)O—) regardless of how they are made. These polyurethanes can contain additional groups such as ester, ether, urea, allophanate, biuret, carbodiimide, oxazolidinyl, isocynaurate, uretdione, carbonate, and the like, in addition to urethane groups. In an aspect, one or more of the polyurethanes can be produced by polymerizing one or more isocyanates with one or more polyols to produce copolymer chains having carbamate linkages (—N(C=O)O—). Additional details regarding the isocyanates and the polyols are provided herein.

The polyurethane can be a block polyurethane co-polymer. In such aspects, the block polyurethane co-polymer can be a block copolymer having blocks of hard segments and blocks of soft segments. In aspects, the hard segments can comprise or consist of isocyanate segments. In the same or alternative aspects, the soft segments can comprise or consist of polyether segments, or polyester segments, or a combination of polyether segments and polyester segments. In a particular aspect, the material can comprise or consist essentially of an elastomeric polyurethane having repeating blocks of hard segments and repeating blocks of soft segments. For example, the material can comprise or consist essentially of a thermoplastic elastomeric polyurethane having repeating blocks of hard segments and repeating blocks of soft segments.

One or more of the polyurethanes can be produced by polymerizing one or more isocyanates with one or more polyols to produce copolymer chains having carbamate linkages (—N(CO)O—) as illustrated below in Formula 1, where the isocyanate(s) each preferably include two or more isocyanate (—NCO) groups per molecule, such as 2, 3, or 4 isocyanate groups per molecule (although, single-functional isocyanates can also be optionally included, e.g., as chain terminating units).

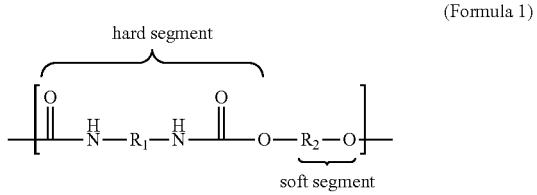

(Formula 1)

In these embodiments, each $R_1$ and $R_2$ independently is an aliphatic or aromatic segment. Optionally, each $R_2$ can be a hydrophilic segment.

Unless otherwise indicated, any of the functional groups or chemical compounds described herein can be substituted or unsubstituted. A "substituted" group or chemical compound, such as an alkyl, alkenyl, alkynyl, cycloalkyl, cycloalkenyl, aryl, heteroaryl, alkoxyl, ester, ether, or carboxylic ester refers to an alkyl, alkenyl, alkynyl, cycloalkyl, cycloalkenyl, aryl, heteroaryl, alkoxyl, ester, ether, or carboxylic ester group, has at least one hydrogen radical that is substituted with a non-hydrogen radical (i.e., a substituent). Examples of non-hydrogen radicals (or substituents) include, but are not limited to, alkyl, cycloalkyl, alkenyl, cycloalkenyl, alkynyl, ether, aryl, heteroaryl, heterocycloalkyl, hydroxyl, oxy (or oxo), alkoxyl, ester, thioester, acyl, carboxyl, cyano, nitro, amino, amido, sulfur, and halo. When a substituted alkyl group includes more than one non-hydrogen radical, the substituents can be bound to the same carbon or two or more different carbon atoms.

Additionally, the isocyanates can also be chain extended with one or more chain extenders to bridge two or more isocyanates. This can produce polyurethane copolymer chains as illustrated below in Formula 2, wherein $R_3$ includes the chain extender. As with each $R_1$ and $R_3$, each $R_3$ independently is an aliphatic or aromatic segment.

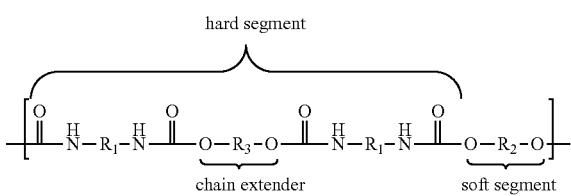

(Formula 2)

Each segment $R_1$, or the first segment, in Formulas 1 and 2 can independently include a linear or branched $C_{3-30}$ segment, based on the particular isocyanate(s) used, and can be aliphatic, aromatic, or include a combination of aliphatic portions(s) and aromatic portion(s). The term "aliphatic" refers to a saturated or unsaturated organic molecule that does not include a cyclically conjugated ring system having delocalized pi electrons. In comparison, the term "aromatic" refers to a cyclically conjugated ring system having delocalized pi electrons, which exhibits greater stability than a hypothetical ring system having localized pi electrons.

Each segment $R_1$ can be present in an amount of 5% to 85% by weight, from 5% to 70% by weight, or from 10% to 50% by weight, based on the total weight of the reactant monomers.

In aliphatic embodiments (from aliphatic isocyanate(s)), each segment $R_1$ can include a linear aliphatic group, a branched aliphatic group, a cycloaliphatic group, or combinations thereof. For instance, each segment $R_1$ can include a linear or branched $C_{3-20}$ alkylene segment (e.g., $C_{4-15}$ alkylene or $C_{6-10}$ alkylene), one or more $C_{3-8}$ cycloalkylene segments (e.g., cyclopropyl, cyclobutyl, cyclopentyl, cyclohexyl, cycloheptyl, or cyclooctyl), and combinations thereof.

Examples of suitable aliphatic diisocyanates for producing the polyurethane copolymer chains include hexamethylene diisocyanate (HDI), isophorone diisocyanate (IPDI), butylenediisocyanate (BDI), bisisocyanatocyclohexylmethane (HMDI), 2,2,4-trimethylhexamethylene diisocyanate (TMDI), bisisocyanatomethylcyclohexane, bisisocyanatomethyltricyclodecane, norbornane diisocyanate (NDI), cyclohexane diisocyanate (CHDI), 4,4'-dicyclohexylmethane diisocyanate (H12MDI), diisocyanatododecane, lysine diisocyanate, and combinations thereof.

In aromatic embodiments (from aromatic isocyanate(s)), each segment $R_1$ can include one or more aromatic groups, such as phenyl, naphthyl, tetrahydronaphthyl, phenanthrenyl, biphenylenyl, indanyl, indenyl, anthracenyl, and fluorenyl. Unless otherwise indicated, an aromatic group can be an unsubstituted aromatic group or a substituted aromatic group, and can also include heteroaromatic groups. "Heteroaromatic" refers to monocyclic or polycyclic (e.g., fused bicyclic and fused tricyclic) aromatic ring systems, where one to four ring atoms are selected from oxygen, nitrogen, or sulfur, and the remaining ring atoms are carbon, and where the ring system is joined to the remainder of the molecule by any of the ring atoms. Examples of suitable heteroaryl groups include pyridyl, pyrazinyl, pyrimidinyl, pyrrolyl, pyrazolyl, imidazolyl, thiazolyl, tetrazolyl, oxazolyl, isooxazolyl, thiadiazolyl, oxadiazolyl, furanyl, quinolinyl, isoquinolinyl, benzoxazolyl, benzimidazolyl, and benzothiazolyl.

Examples of suitable aromatic diisocyanates for producing the polyurethane copolymer chains include toluene diisocyanate (TDI), TDI adducts with trimethyloylpropane (TMP), methylene diphenyl diisocyanate (MDI), xylene diisocyanate (XDI), tetramethylxylylene diisocyanate (TMXDI), hydrogenated xylene diisocyanate (HXDI), naphthalene 1,5-diisocyanate (NDI), 1,5-tetrahydronaphthalene diisocyanate, para-phenylene diisocyanate (PPDI), 3,3'-dimethyldiphenyl-4,4'-diisocyanate (DDDI), 4,4'-dibenzyl diisocyanate (DBDI), 4-chloro-1,3-phenylene diisocyanate, and combinations thereof. In some embodiments, the copolymer chains are substantially free of aromatic groups.

The polyurethane polymer chains are produced from diisocynates including HMDI, TDI, MDI, $H_{12}$ aliphatics, and combinations thereof.

Polyurethane chains which are crosslinked (e.g., partially crosslinked polyurethane polymers, such as partially crosslinked polyurethane polymers which retain thermoplastic properties) or which can be crosslinked, can be used in accordance with the present disclosure. It is possible to produce crosslinked or crosslinkable polyurethane polymer chains using multi-functional isocyantes. Examples of suitable triisocyanates for producing the polyurethane copolymer chains include TDI, HDI, and IPDI adducts with trimethyloylpropane (TMP), uretdiones (i.e., dimerized isocyanates), polymeric MDI, and combinations thereof.

Segment $R_3$ in Formula 2 can include a linear or branched $C_2$-$C_{10}$ segment, based on the particular chain extender polyol used, and can be, for example, aliphatic, aromatic, or polyether. Examples of suitable chain extender polyols for producing the polyurethane copolymer chains include ethylene glycol, lower oligomers of ethylene glycol (e.g., diethylene glycol, triethylene glycol, and tetraethylene glycol), 1,2-propylene glycol, 1,3-propylene glycol, lower oligomers of propylene glycol (e.g., dipropylene glycol, tripropylene glycol, and tetrapropylene glycol), 1,4-butylene glycol, 2,3-butylene glycol, 1,6-hexanediol, 1,8-octanediol, neopentyl glycol, 1,4-cyclohexanedimethanol, 2-ethyl-1,6-hexanediol, 1-methyl-1,3-propanediol, 2-methyl-1,3-propanediol, dihydroxyalkylated aromatic compounds (e.g., bis (2-hydroxyethyl) ethers of hydroquinone and resorcinol, xylene-a,a-diols, bis(2-hydroxyethyl) ethers of xylene-a,a-diols, and combinations thereof.

Segment $R_2$ in Formula 1 and 2 can include a polyether group, a polyester group, a polycarbonate group, an aliphatic group, or an aromatic group. Each segment $R_2$ can be present in an amount of 5% to 85% by weight, from 5% to 70% by weight, or from 10% to 50% by weight, based on the total weight of the reactant monomers.

Optionally, in some examples, the polyurethane of the present disclosure can be a polyurethane having a relatively greater degree of hydrophilicity. For example, the polyurethane can be a polyurethane in which segment $R_2$ in Formulas 1 and 2 includes a polyether group, a polyester group, a polycarbonate group, an aliphatic group, or an aromatic group, wherein the aliphatic group or aromatic group is substituted with one or more pendant group having relatively greater degree of hydrophilicity (i.e., relatively "hydrophilic" groups). The relatively "hydrophilic" groups can be selected from the group consisting of hydroxyl, polyether, polyester, polylactone (e.g., polyvinylpyrrolidone (PVP)), amino, carboxylate, sulfonate, phosphate, ammonium (e.g., tertiary and quaternary ammonium), zwitterion (e.g., a betaine, such as poly(carboxybetaine (pCB) and ammonium phosphonates such as phosphatidylcholine), and combinations thereof. In such examples, this relatively hydrophilic group or segment of $R_2$ can form portions of the polyurethane backbone, or can be grafted to the polyurethane backbone as a pendant group. In some examples, the pendant hydrophilic group or segment can be bonded to the aliphatic group or aromatic group through a linker. Each segment $R_2$ can be present in an amount of 5% to 85% by weight, from 5% to 70% by weight, or from 10% to 50% by weight, based on the total weight of the reactant monomers.

In some examples, at least one $R_2$ segment of the polyurethane includes a polyether segment (i.e., a segment having one or more ether groups). Suitable polyethers include, but are not limited to polyethylene oxide (PEO), polypropylene oxide (PPO), polytetrahydrofuran (PTHF), polytetramethylene oxide (PTMO), and combinations thereof. The term "alkyl" as used herein refers to straight chained and branched saturated hydrocarbon groups containing one to thirty carbon atoms, for example, one to twenty carbon atoms, or one to ten carbon atoms. The term $C_n$ means the alkyl group has "n" carbon atoms. For example, $C_4$ alkyl refers to an alkyl group that has 4 carbon atoms. $C_{1-7}$ alkyl refers to an alkyl group having a number of carbon atoms encompassing the entire range (i.e., 1 to 7 carbon atoms), as well as all subgroups (e.g., 1-6, 2-7, 1-5, 3-6, 1, 2, 3, 4, 5, 6, and 7 carbon atoms). Non-limiting examples of alkyl groups include, methyl, ethyl, n-propyl, isopropyl, n-butyl, sec-butyl (2-methylpropyl), t-butyl (1,1-dimethylethyl), 3,3-dimethylpentyl, and 2-ethylhexyl. Unless otherwise indicated, an alkyl group can be an unsubstituted alkyl group or a substituted alkyl group.

In some examples of the polyurethane, the at least one $R_2$ segment includes a polyester segment. The polyester segment can be derived from the polyesterification of one or more dihydric alcohols (e.g., ethylene glycol, 1,3-propylene glycol, 1,2-propylene glycol, 1,4-butanediol, 1,3-butanediol, 2-methylpentanediol-1,5,diethylene glycol, 1,5-pentanediol, 1,5-hexanediol, 1,2-dodecanediol, cyclohexanedimethanol, and combinations thereof) with one or more dicarboxylic acids (e.g., adipic acid, succinic acid, sebacic acid, suberic acid, methyladipic acid, glutaric acid, pimelic acid, azelaic acid, thiodipropionic acid and citraconic acid and combinations thereof). The polyester also can be derived from polycarbonate prepolymers, such as poly(hexamethylene carbonate) glycol, poly(propylene carbonate) glycol, poly (tetramethylene carbonate)glycol, and poly(nonanemethylene carbonate) glycol. Suitable polyesters can include, for example, polyethylene adipate (PEA), poly(1,4-butylene adipate), poly(tetramethylene adipate), poly(hexamethylene adipate), polycaprolactone, polyhexamethylene carbonate, poly(propylene carbonate), poly(tetramethylene carbonate), poly(nonanemethylene carbonate), and combinations thereof.

In various examples of the polyurethane, at least one $R_2$ segment includes a polycarbonate segment. The polycarbonate segment can be derived from the reaction of one or more dihydric alcohols (e.g., ethylene glycol, 1,3-propylene glycol, 1,2-propylene glycol, 1,4-butanediol, 1,3-butanediol, 2-methylpentanediol-1,5, diethylene glycol, 1,5-pentanediol, 1,5-hexanediol, 1,2-dodecanediol, cyclohexanedimethanol, and combinations thereof) with ethylene carbonate.

In various examples of the polyurethane, at least one $R_2$ segment can include an aliphatic group substituted with one or more groups having a relatively greater degree of hydrophilicity, i.e., a relatively "hydrophilic" group. The one or more relatively hydrophilic group can be selected from the group consisting of hydroxyl, polyether, polyester, polylactone (e.g., polyvinylpyrrolidone), amino, carbonxylate, sulfonate, phosphate, ammonium (e.g., tertiary and quaternary ammonium), zwitterion (e.g., a betaine, such as poly (carboxybetaine (pCB) and ammonium phosphonates such as phosphatidylcholine), and combinations thereof. In some examples, the aliphatic group is linear and can include, for example, a $C_{1-20}$ alkylene chain or a $C_{1-20}$ alkenylene chain (e.g., methylene, ethylene, propylene, butylene, pentylene, hexylene, heptylene, octylene, nonylene, decylene, undecylene, dodecylene, tridecylene, ethenylene, propenylene, butenylene, pentenylene, hexenylene, heptenylene, octenylene, nonenylene, decenylene, undecenylene, dodecenylene, tridecenylene). The term "alkylene" refers to a bivalent hydrocarbon. The term $C_n$ means the alkylene group has "n" carbon atoms. For example, $C_{1-6}$ alkylene refers to an alkylene group having, e.g., 1, 2, 3, 4, 5, or 6 carbon atoms. The term "alkenylene" refers to a bivalent hydrocarbon having at least one double bond.

In some cases, at least one $R_2$ segment includes an aromatic group substituted with one or more relatively hydrophilic group. The one or more hydrophilic group can be selected from the group of hydroxyl, polyether, polyester, polylactone (e.g., polyvinylpyrrolidone), amino, carboxylate, sulfonate, phosphate, ammonium (e.g., tertiary and quaternary ammonium), zwitterionic (e.g., a betaine, such as poly(carboxybetaine (pCB) and ammonium phosphonate groups such as phosphatidylcholine), and combinations thereof. Suitable aromatic groups include, but are not limited to, phenyl, naphthyl, tetrahydronaphthyl, phenanthrenyl, biphenylenyl, indanyl, indenyl, anthracenyl, fluorenylpyridyl, pyrazinyl, pyrimidinyl, pyrrolyl, pyrazolyl, imidazolyl, thiazolyl, tetrazolyl, oxazolyl, isooxazolyl, thiadiazolyl, oxadiazolyl, furanyl, quinolinyl, isoquinolinyl, benzoxazolyl, benzimidazolyl, and benzothiazolyl groups, and combinations thereof.

The aliphatic and aromatic groups may be substituted with one or more pendant relatively hydrophilic and/or charged groups. In some aspects, the pendant hydrophilic group includes one or more (e.g., 2, 3, 4, 5, 6, 7, 8, 9, 10 or more) hydroxyl groups. In various aspects, the pendant hydrophilic group includes one or more (e.g., 2, 3, 4, 5, 6, 7, 8, 9, 10 or more) amino groups. In some cases, the pendant hydrophilic group includes one or more (e.g., 2, 3, 4, 5, 6, 7, 8, 9, 10 or more) carboxylate groups. For example, the aliphatic group can include one or more polyacrylic acid group. In some cases, the pendant hydrophilic group includes one or more (e.g., 2, 3, 4, 5, 6, 7, 8, 9, 10 or more) sulfonate groups. In some cases, the pendant hydrophilic group includes one or more (e.g., 2, 3, 4, 5, 6, 7, 8, 9, 10 or more) phosphate groups. In some examples, the pendant hydrophilic group includes one or more ammonium groups (e.g., tertiary and/or quaternary ammonium). In other examples, the pendant hydrophilic group includes one or more zwitterionic groups (e.g., a betaine, such as poly (carboxybetaine (pCB) and ammonium phosphonate groups such as a phosphatidylcholine group).

The $R_2$ segment can include charged groups that are capable of binding to a counterion to ionically crosslink the thermoplastic polymer and form ionomers. In these aspects, for example, $R_2$ is an aliphatic or aromatic group having pendant amino, carboxylate, sulfonate, phosphate, ammonium, or zwitterionic groups, or combinations thereof.

In various cases when a pendant hydrophilic group is present, the pendant "hydrophilic" group is at least one polyether group, such as two polyether groups. In other cases, the pendant hydrophilic group is at least one polyester. In various cases, the pendant hydrophilic group is polylactone group (e.g., polyvinylpyrrolidone). Each carbon atom of the pendant hydrophilic group can optionally be substituted with, e.g., a $C_{1-6}$ alkyl group. In some of these aspects, the aliphatic and aromatic groups can be graft polymeric groups, wherein the pendant groups are homopolymeric groups (e.g., polyether groups, polyester groups, polyvinylpyrrolidone groups).

The pendant hydrophilic group is a polyether group (e.g., a polyethylene oxide group, a polyethylene glycol group), a polyvinylpyrrolidone group, a polyacrylic acid group, or combinations thereof.

The pendant hydrophilic group can be bonded to the aliphatic group or aromatic group through a linker. The linker can be any bifunctional small molecule (e.g., $C_{1-20}$) capable of linking the pendant hydrophilic group to the aliphatic or aromatic group. For example, the linker can include a diisocyanate group, as previously described herein, which when linked to the pendant hydrophilic group and to the aliphatic or aromatic group forms a carbamate bond. In some aspects, the linker can be 4,4'-diphenylmethane diisocyanate (MDI), as shown below.

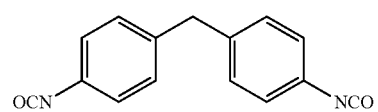

(Formula 3)

In some exemplary aspects, the pendant hydrophilic group is a polyethylene oxide group and the linking group is MDI, as shown below.

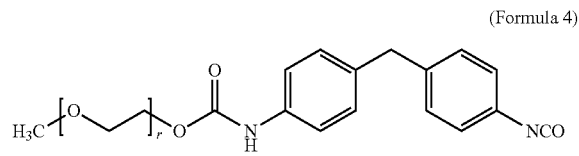

(Formula 4)

In some cases, the pendant hydrophilic group is functionalized to enable it to bond to the aliphatic or aromatic group, optionally through the linker. In various aspects, for example, when the pendant hydrophilic group includes an alkene group, which can undergo a Michael addition with a sulfhydryl-containing bifunctional molecule (i.e., a molecule having a second reactive group, such as a hydroxyl group or amino group), to result in a hydrophilic group that can react with the polymer backbone, optionally through the linker, using the second reactive group. For example, when the pendant hydrophilic group is a polyvinylpyrrolidone group, it can react with the sulfhydryl group on mercaptoethanol to result in hydroxyl-functionalized polyvinylpyrrolidone, as shown below.

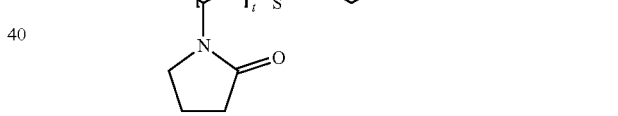

(Formula 5)

In some of the aspects disclosed herein, at least one $R_2$ segment includes a polytetramethylene oxide group. In other exemplary aspects, at least one $R_2$ segment can include an aliphatic polyol group functionalized with a polyethylene oxide group or polyvinylpyrrolidone group, such as the polyols described in E.P. Patent No. 2 462 908. For example, the $R_2$ segment can be derived from the reaction product of a polyol (e.g., pentaerythritol or 2,2,3-trihydroxypropanol) and either MDI-derivatized methoxypolyethylene glycol (to obtain compounds as shown in Formulas 6 or 7) or with MDI-derivatized polyvinylpyrrolidone (to obtain compounds as shown in Formulas 8 or 9) that had been previously been reacted with mercaptoethanol, as shown below.

(Formula 6)

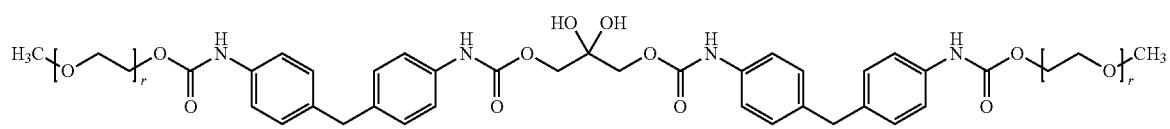

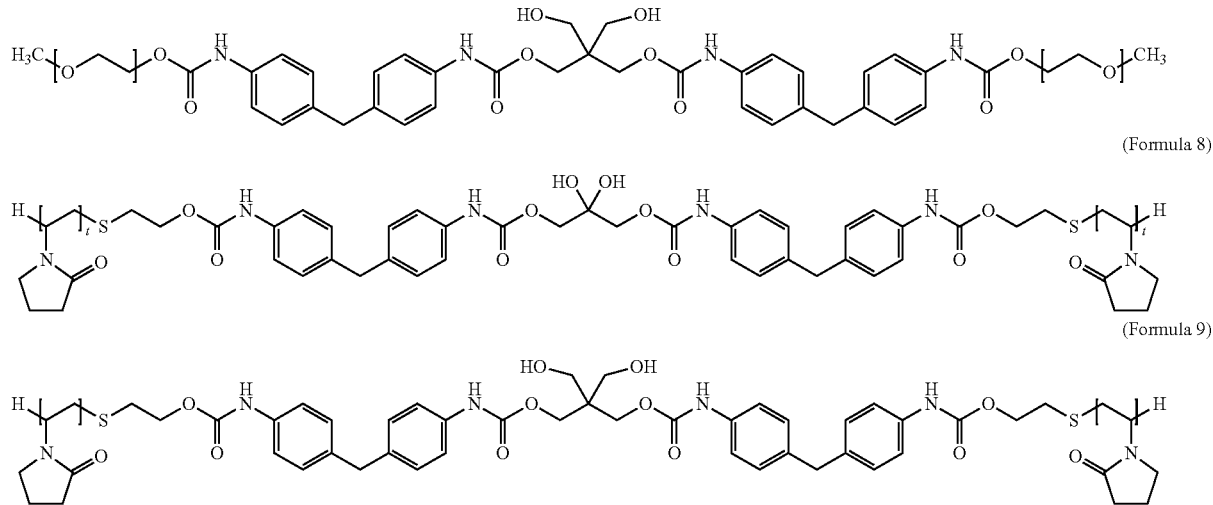

(Formula 7)

(Formula 8)

(Formula 9)

In various cases, at least one $R_2$ is a polysiloxane, In these cases, $R_2$ can be derived from a silicone monomer of Formula 10, such as a silicone monomer disclosed in U.S. Pat. No. 5,969,076, which is hereby incorporated by reference:

(Formula 10)

$$HO-R^5-\underset{\underset{R_4}{|}}{\overset{\overset{R_4}{|}}{Si}}-(O-\underset{\underset{R_4}{|}}{\overset{\overset{R_4}{|}}{Si}})_a-R^5-OH$$

wherein: a is 1 to 10 or larger (e.g., 1, 2, 3, 4, 5, 6, 7, 8, 9, or 10); each $R_4$ independently is hydrogen, $C_{1-18}$ alkyl, $C_{2-18}$ alkenyl, aryl, or polyether; and each $R_5$ independently is $C_{1-10}$ alkylene, polyether, or polyurethane.

Each $R_4$ independently can be a H, $C_{1-10}$ alkyl, $C_{2-10}$ alkenyl, $C_{1-6}$ aryl, polyethylene, polypropylene, or polybutylene group. For example, each $R_4$ can independently be selected from the group consisting of methyl, ethyl, n-propyl, isopropyl, n-butyl, isobutyl, s-butyl, t-butyl, ethenyl, propenyl, phenyl, and polyethylene groups.

Each $R^5$ independently can include a $C_{1-10}$ alkylene group (e.g., a methylene, ethylene, propylene, butylene, pentylene, hexylene, heptylene, octylene, nonylene, or decylene group). In other cases, each $R^5$ is a polyether group (e.g., a polyethylene, polypropylene, or polybutylene group). In various cases, each $R_5$ is a polyurethane group.

Optionally, the polyurethane can include an at least partially crosslinked polymeric network that includes copolymer chains that are derivatives of polyurethane. In some cases, the level of crosslinking is such that the polyurethane retains thermoplastic properties (i.e., the crosslinked thermoplastic polyurethane can be softened or melted and re-solidified under the processing conditions described herein). This crosslinked polymeric network can be produced by polymerizing one or more isocyanates with one or more polyamino compounds, polysulfhydryl compounds, or combinations thereof, as shown in Formulas 11 and 12, below:

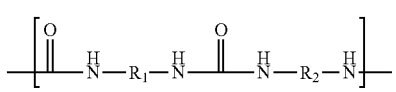

(Formula 11)

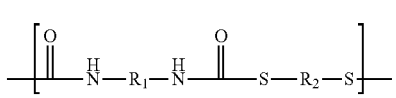

(Formula 12)

wherein the variables are as described above. Additionally, the isocyanates can also be chain extended with one or more polyamino or polythiol chain extenders to bridge two or more isocyanates, such as previously described for the polyurethanes of Formula 2.

The polyurethane is a thermoplastic polyurethane is composed of MDI, PTMO, and 1,4-butylene glycol, as described in U.S. Pat. No. 4,523,005.

As described herein, the polyurethane can be physically crosslinked through e.g., nonpolar or polar interactions between the urethane or carbamate groups on the polymers (the hard segments. In these aspects, component $R_1$ in Formula 1, and components $R_1$ and $R_3$ in Formula 2, forms the portion of the polymer often referred to as the "hard segment", and component $R_2$ forms the portion of the polymer often referred to as the "soft segment". In these aspects, the soft segment can be covalently bonded to the hard segment. In some examples, the thermoplastic polyurethane having physically crosslinked hard and soft segments can be a hydrophilic thermoplastic polyurethane (i.e., a thermoplastic polyurethane including hydrophilic groups as disclosed herein).

Now having described the composite structure in general, additional details are provided. The composite structure includes a material (e.g., solid resin or a foam) bonded to a substrate (e.g., a solid resin or a foam comprising the polymeric composition), where the material comprises a plurality of first polyurethane (PU) chains and the substrate includes a polymeric composition including a plurality of second polymer chains. The substrate has a first side including a bonding layer bonded to the material. The bonding layer includes a plurality of chemical bonds between a portion of the plurality of first PU chains and a portion of the plurality of second polymer chains. A portion of the chemical bonds can include siloxane linkages, silanol linkages, silyl linkages, or any combination thereof. With the exception of the bonding layer, the material is substantially free of PU chains including siloxane linkages, silanol linkages, and silyl linkages. The polymeric composition of the substrate is substantially free of second polymer chains including siloxane linkages, silanol linkages, and silyl linkages. Once the composite material is formed, the composite material can be incorporated into a textile such as footwear or apparel.

Forming the chemical bonds between a portion of the plurality of free radical moieties of the bonding layer and a first portion of the plurality of first PU polymer chains of the material can include forming chemical bonds between the portion of the plurality of free radical moieties of the bonding layer and a first portion of urethane moieties of the plurality of first PU polymer chains of the material.

Forming chemical bonds between a portion of the plurality of silicates of the bonding layer and a second portion of the plurality of first PU polymer chains of the material can include forming chemical bonds between the portion of the plurality of silicates of the bonding layer and a second portion of urethane moieties of the plurality of first PU polymer chains of the material.

Forming chemical bonds between the portion of the plurality of free radical moieties of the bonding layer and the first portion of the plurality of first PU polymer chains of the material, between the portion of the plurality of silicates of the bonding layer and the second portion of the plurality of first PU polymer chains or of the polymeric material, or both, can include forming urethane-siloxane linkages, urethane-silanol linkages, urethane-silyl linkages, or any combination thereof.

The two or more sides of the substrate can include the bonding layer, where the material is disposed on two or more sides of the substrate. A plurality of substrates each including the bonding layer on substantially the entire surface area or on the entire surface area of the substrate can have a material disposed around some or all of surface area of the substrates. The substrate(s) can be embedded within the material to form the composite structure. Once the composite material is formed, the composite material can be incorporated into a textile such as footwear or apparel.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5 percent" should be interpreted to include not only the explicitly recited concentration of about 0.1 weight percent to about 5 weight percent, but also include individual concentrations (e.g., 1 percent, 2 percent, 3 percent, and 4 percent) and the sub-ranges (e.g., 0.5 percent, 1.1 percent, 2.2 percent, 3.3 percent, and 4.4 percent) within the indicated range. In an aspect, the term "about" can include traditional rounding according to significant figures of the numerical value. In addition, the phrase "about 'x' to 'y'" includes "about 'x' to about 'y'".

Many variations and modifications may be made to the above-described aspects. All such modifications and variations are intended to be included herein within the scope of this disclosure and protected by the following claims.

What is claimed:

1. A method of making an article of footwear, the method comprising:
   forming a bonding layer that comprises a plurality of silicates on a polymeric composition defining a surface of a component of footwear;
   contacting the bonding layer with a material comprising a plurality of polyurethane (PU) polymer chains; and
   forming chemical bonds between a portion of the plurality of silicates of the bonding layer and a first portion of the plurality of PU polymer chains of the material, thereby bonding the component of footwear to the material.

2. The method of claim 1, wherein the forming the bonding layer comprises treating the surface of the component of footwear using a process chosen from flame silanization, deposition of silicates, or both, thereby forming the plurality of silicates on the surface of the component of footwear.

3. The method of claim 1, wherein the forming chemical bonds includes forming siloxane linkages, silanol linkages, silyl linkages, or any combination thereof.

4. The method of claim 3, wherein the forming chemical bonds includes forming urethane-siloxane linkages, urethane-silanol linkages, urethane-silyl linkages, or any combination thereof.

5. The method of claim 1, wherein, during the contacting, the material is a liquid resin or a foam.

6. The method of claim 1, wherein the polymeric composition of the component of footwear comprises a plurality of polymer chains chosen from cured rubber polymer chains, polyether block amide polymer chains, ethylene vinyl acetate polymer chains, or any combination thereof.

7. The method of claim 6, wherein the polymeric composition of the component of footwear comprises the plurality of polyether block amide polymer chains.

8. The method of claim 6, wherein the polymeric composition of the component of footwear comprises the plurality of ethylene vinyl acetate polymer chains.

9. The method of claim 6, wherein the component of footwear comprises the plurality of cured rubber polymer chains.

10. The method of claim 9, wherein the plurality of cured rubber polymer chains comprise a plurality of cured rubber chains individually having a maleic anhydride moiety grafted to the rubber chain.

11. The method of claim 1, wherein the step of forming the bonding layer further comprises forming a bonding layer that comprises a plurality of free radical moieties on the polymeric composition defining the surface of the component of footwear; and the step of forming the chemical bonds further comprises forming chemical bonds between a portion of the plurality of free radical moieties of the bonding layer and a second portion of the plurality of PU polymer chains of the material.

12. The method of claim 11, wherein the forming the bonding layer comprises treating the surface of the component of footwear using a process chosen from hydrocarbon flame processing, plasma processing, corona processing, or any combination thereof, thereby forming the plurality of free radical moieties on the surface of the component of footwear.

13. The method of claim 11, wherein forming the chemical bonds includes forming chemical bonds between a portion of the plurality of free radical moieties of the bonding layer and a second portion of urethane moieties of the plurality of PU polymer chains of the material.

* * * * *